United States Patent
Hubbe et al.

(10) Patent No.: US 6,667,748 B1
(45) Date of Patent: Dec. 23, 2003

(54) METHOD OF DISPLAYING IMAGE SEQUENCES ON MOBILE RADIO COMMUNICATIONS EQUIPMENT CO-OPERATING WITH A SUBSCRIBER IDENTITY MODULE

(75) Inventors: Pascal Hubbe, Paris (FR); Anne-Gaëlle Lelong-Gilbert, Viroflay (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/295,444

(22) Filed: Apr. 21, 1999

(30) Foreign Application Priority Data

May 7, 1998 (FR) .............................................. 98 05835

(51) Int. Cl.7 ................................................ G09G 5/00
(52) U.S. Cl. ........................................ 345/723; 455/566
(58) Field of Search ................................. 345/762, 764, 345/765, 733, 751, 723; 455/566, 572, 558, 556

(56) References Cited

U.S. PATENT DOCUMENTS

| | | | | |
|---|---|---|---|---|
| 5,875,404 A | * | 2/1999 | Messiet | 455/558 |
| 6,040,829 A | * | 3/2000 | Croy et al. | 345/731 |
| 6,069,593 A | * | 5/2000 | Lebby et al. | 455/557 |
| 6,073,034 A | * | 6/2000 | Jacobsen et al. | 455/566 |
| 6,115,617 A | * | 9/2000 | Ib | 455/564 |
| 6,211,858 B1 | * | 4/2001 | Moon et al. | 345/146 |
| 6,278,885 B1 | * | 8/2001 | Hubbe et al. | 455/558 |
| 6,381,468 B1 | * | 4/2002 | Larsen et al. | 455/550 |

FOREIGN PATENT DOCUMENTS

| | | | |
|---|---|---|---|
| EP | 0 831 629 A2 | 3/1998 | |
| FI | 0858202 A2 | * 8/1998 | |
| JP | 0773685 A1 | * 12/1991 | H04N/7/14 |

* cited by examiner

Primary Examiner—Cao (Kevin) Nguyen
(74) Attorney, Agent, or Firm—Sughrue Mion, PLLC

(57) ABSTRACT

A method of displaying a sequence of images on a display associated with a piece of radio communications mobile equipment co-operating with a subscriber identity module, the method including the following steps in order: the subscriber identity module sends an image sequence display command to said mobile equipment; and the mobile equipment executes the command on the display.

14 Claims, 1 Drawing Sheet

METHOD OF DISPLAYING IMAGE SEQUENCES ON MOBILE RADIO COMMUNICATIONS EQUIPMENT CO-OPERATING WITH A SUBSCRIBER IDENTITY MODULE

FIELD OF THE INVENTION

The present invention relates to a radio communications system, in particular of the GSM type (global system for mobile communications), or of the DCS type (digital cellular system), or indeed of the PCS type (personal communication system).

More particularly, the invention relates to a method enabling graphic animation to be displayed on a screen of a piece of mobile radio communications equipment at the request of a subscriber identity module connected to said equipment.

BACKGROUND OF THE INVENTION

The GSM recommendations of the ETSI (European Telecommunications Standards Institute) recommend using a subscriber identity module (SIM) for storing both data specific to the user and data relating to additional services which it supplies to the radio communications terminal.

ETSI recommendation GSM 11.11 entitled *Digital cellular telecommunications system* (phase 2+); specification of the subscriber identity module—mobile equipment (SIM-ME) interface defines the interface between the subscriber identity module (SIM) and the mobile equipment (ME).

ETSI recommendation GSM 11.14 entitled *Digital cellular telecommunications system* (phase 2+); specification of the SIM application toolkit for the subscriber identity module—mobile equipment (SIM-ME) interface defines the way in which applications (or services) stored in the subscriber identity module (SIM) are to communicate with the mobile equipment (ME).

In particular, that recommendation describes a set of functions known as "proactive" functions that the subscriber identity module can send to the mobile equipment.

The additional services which are stored in the subscriber identity module can be of different kinds and at different levels. By way of example, the following can be mentioned:

a service for storing data of the telephone directory type;

a service for sending and receiving short alphanumeric messages ("SMS" in GSM terminology for short message service); and a service for displaying alphanumeric data on the screen of the mobile equipment.

The advantage of operating in that way is that services and equipment types are made independent. It is then possible to make use of services offered by a subscriber identity module from any piece of radio communications equipment, i.e. independently of the manufacturer thereof.

Nevertheless, in the state of the art, it turns out that it is not possible to display an animated image sequence on the screen of a terminal from a subscriber identity module.

In the context of the GSM 11.11 and GSM 11.14 recommendations, the only option available to the subscriber identity module for displaying information on the screen of the terminal is to present a DISPLAY TEXT command.

OBJECTS AND SUMMARY OF THE INVENTION

The present invention seeks to mitigate a gap in the state of the art by enabling a subscriber identity module to display a sequence of images on the screen of a radio communications terminal.

For this purpose, the invention provides a method of displaying a sequence of images on the display means associated with a piece of radio communications mobile equipment co-operating with a subscriber identity module, the method comprising the following steps in order:

said subscriber identity module sends an image sequence display command to said mobile equipment; and said mobile equipment executes said command on said display means.

In order to implement the method, the invention also provides a radio communications system comprising a subscriber identity module co-operating with a piece of mobile equipment possessing display means, said subscriber identity module having means for sending a command for displaying a sequence of images to said mobile equipment, and said mobile equipment having means for executing said command on said display means.

BRIEF DESCRIPTION OF THE DRAWINGS

Other characteristics and advantages of the invention will appear on reading the following description of a preferred embodiment of the invention given by way of non-limiting indication, and from the accompanying figures.

MORE DETAILED DESCRIPTION

The description below relates to ETSI recommendations GSM 11.11 and GSM 11.14. Nevertheless, it is within the competence of the person skilled in the art to extend the example given to other radio communications systems.

Figure 1:
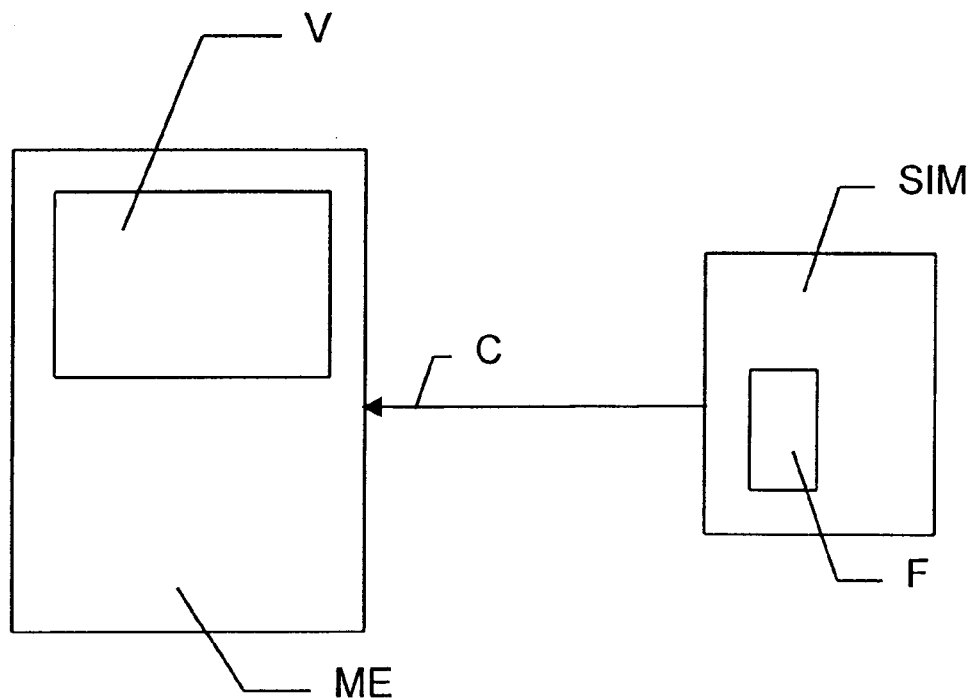
FIG. 1 shows a radio communications system constituting a particular embodiment of the invention, including a subscriber identity module and a piece of mobile equipment.

According to recommendation GSM 11.1 and as shown in FIG. 1, a radio communications terminal comprises a subscriber identity module SIM and a piece of mobile equipment ME.

The communications protocol and the interface between those two elements are described in recommendation GSM 11.11 for general aspects and in recommendation GSM 11.14 for the various functions that the subscriber identity module SIM can send to the mobile equipment ME.

In accordance with those recommendations, the protocol is of the master/slave type with the mobile equipment ME always acting as the master. In particular, that means that the subscriber identity module SIM cannot send a command to the mobile equipment ME unless the mobile equipment has requested the command.

The mechanism for sending a command by the subscriber identity module to the mobile equipment is described in greater detail in paragraph 6.1 of recommendation GSM 11.14: when the mobile equipment ME sends a command to the subscriber identity module SIM, the subscriber identity module returns a result message which includes a status field.

A certain value of the status field tells the equipment that the subscriber identity module SIM seeks to issue a proactive command. At that moment, the mobile equipment ME issues a particular command FETCH to recover the proactive command.

In an implementation of the invention, the new command is added to the set of so-called "proactive" commands that are already in existence. This command informs the mobile equipment ME that a sequence of images is to be displayed on the display means V associated therewith.

In another implementation of the invention, an existing command is modified to enable it to tell the mobile equipment ME that a sequence of images is to be displayed on the display means V associated therewith.

The sequence of images proper can, for example, be stored in a file F within the subscriber identity module SIM.

In which case, the subscriber identity module SIM initially sends a command C to the mobile equipment ME instructing it to display a sequence of images on the display means V. Thereafter, the mobile equipment ME reads all or some of the sequence of images from the file F and displays the sequence on the display means V.

The structure of the file system in a subscriber identity module and the way in which it should be addressed are described in GSM recommendation 11.11 of the ETSI.

Figure 2:
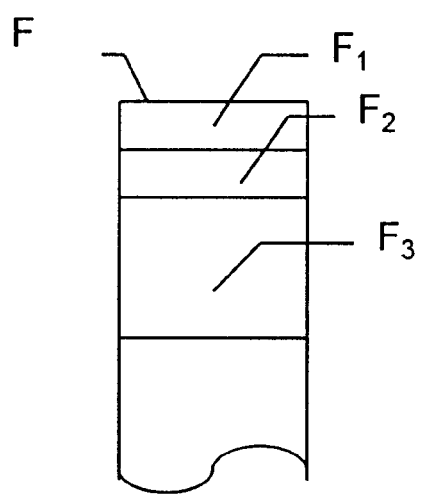
FIG. 2 shows a preferred implementation for storing the sequence of images in a file of the subscriber identity module.

In an embodiment of the invention, and as shown in FIG. 2, the various animation images are stored sequentially in a file F. Each image is stored in three fields of the file F:

a first field $F_1$ contains the width of the image as a number of pixels;

a second field $F_2$ contains the height of the image as a number of pixels; and a third field $F_3$ contains the values for the pixels of the image, stored in sequential manner.

It should be observed that in compliance with recommendation GSM 11.14, the command C may include a set of parameters which, taken together, must not exceed 256 bytes.

By way of example, the command C may have a parameter giving the number of images in the sequence.

Optionally, it may also have a parameter indicating the time for which each of the images of the sequence is to be displayed. For example, such a parameter makes it possible to specify a pause time on one or more images of the sequence, rather than having an animated sequence that runs at constant speed.

Another optional parameter can be the direction in which the sequence is displayed. The images of the sequence can be numbered 1 to N. This parameter determines whether they are to be displayed in increasing order (image 1, image 2, image 3, . . . , image N, image 1, image 2, . . . ), or in decreasing order (image N, image N–1, . . . , image 1, image N, image N–1, . . . ). This parameter can thus be of the Boolean type.

Another parameter can be the duration of the sequence, e.g. expressed as a number of seconds.

What is claimed is:

1. A method of displaying a sequence of images on a display associated with a piece of radio communications mobile equipment co-operating with a subscriber identity module, the method comprising the following, in order:

said subscriber identity module sends an image sequence display command to said mobile equipment; and said mobile equipment executes said command by displaying said sequence of images on said display;

wherein the images include image data from the subscriber identity module.

2. A method according to claim 1, wherein said image sequence display command includes at least one parameter from the following set of parameters:

a number of images in said sequence of images;

a display time for each of the images of said sequence of images; and a direction in which said images are to be displayed.

3. A method according to claim 1, wherein said image sequence display command is a command from a set of commands of said subscriber identity module, as defined by ETSI recommendations GSM 11.11 and GSM 11.14.

4. A method according to claim 1, wherein said sequence of images is stored in a file of said subscriber identity module.

5. A method according to claim 4, wherein the executing of said command by said mobile equipment is preceded by a reading of said sequence of images from said file.

6. A method according to claim 1, wherein said image sequence display command sent by said subscriber identity module is obtained by modifying an existing command stored in said subscriber identity module.

7. A method according to claim 1, further comprising storing, within said subscriber identity module, information that categorizes said sequence of images.

8. A method according to claim 1, further comprising storing, within said subscriber identity module, each image of said sequence of images in a plurality of fields.

9. A method according to claim 1, wherein said image sequence display command sent by said subscriber identity module has a size less than or equal to 256 bytes.

10. A method according to claim 1, wherein said image sequence display command sent by said subscriber identity module includes time information for individual images of said sequence of images.

11. A method according to claim 1, further comprising using time information contained in said image sequence display command to insert pause times during said displaying.

12. A method according to claim 1, wherein said image sequence display command sent by said subscriber identity module includes information of a total time for displaying said sequence of images.

13. A radio communications system comprising a subscriber identity module co-operating with a piece of mobile equipment possessing a display, said subscriber identity module having means for sending a command, for displaying a sequence of images, to said mobile equipment, and said mobile equipment having means for executing said command by displaying said sequence of images on said display, wherein the images include image data from the subscriber identity module.

14. A radio communications system according to claim 13, wherein said sequence of images is stored in a file of said subscriber identity module.

* * * * *